United States Patent
Bradfield

(10) Patent No.: US 9,203,268 B2
(45) Date of Patent: Dec. 1, 2015

(54) STARTER MACHINE PERFORMANCE IMPROVEMENT

(71) Applicant: Remy Technologies, LLC, Pendleton, IN (US)

(72) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 363 days.

(21) Appl. No.: 13/935,284

(22) Filed: Jul. 3, 2013

(65) Prior Publication Data

US 2014/0009018 A1 Jan. 9, 2014

Related U.S. Application Data

(60) Provisional application No. 61/668,919, filed on Jul. 6, 2012.

(51) Int. Cl.
| | |
|---|---|
| H02K 3/34 | (2006.01) |
| H02K 1/02 | (2006.01) |
| H02K 7/116 | (2006.01) |
| H02K 7/108 | (2006.01) |
| B60L 11/14 | (2006.01) |
| B60L 15/20 | (2006.01) |
| F02N 11/08 | (2006.01) |
| F02N 15/02 | (2006.01) |
| F02N 15/04 | (2006.01) |
| F02N 15/06 | (2006.01) |

(52) U.S. Cl.
CPC . *H02K 1/02* (2013.01); *B60L 11/14* (2013.01); *B60L 15/20* (2013.01); *F02N 15/067* (2013.01); *H02K 7/1085* (2013.01); *H02K 7/116* (2013.01); *B60L 2220/50* (2013.01); *B60L 2240/421* (2013.01); *B60L 2240/423* (2013.01); *B60L 2240/441* (2013.01); *B60L 2240/443* (2013.01); *B60L 2260/22* (2013.01); *B60L 2260/26* (2013.01); *F02N 11/0862* (2013.01); *F02N 15/022* (2013.01); *F02N 15/046* (2013.01); *F02N 15/062* (2013.01)

(58) Field of Classification Search
CPC .................................................. H02P 29/00
USPC .................................................. 110/103
See application file for complete search history.

(56) References Cited

U.S. PATENT DOCUMENTS

| | | | | |
|---|---|---|---|---|
| 6,392,370 | B1 * | 5/2002 | Bedini | 318/140 |
| 6,756,870 | B2 * | 6/2004 | Kuwahara | 335/224 |
| 2009/0121557 | A1 * | 5/2009 | Yang | 310/12 |
| 2013/0187580 | A1 * | 7/2013 | Murray et al. | 318/400.3 |
| 2014/0265679 | A1 * | 9/2014 | Bradfield | 310/83 |

* cited by examiner

*Primary Examiner* — Joseph Waks
(74) *Attorney, Agent, or Firm* — Bose McKinney & Evans LLP

(57) ABSTRACT

A rotary electric starter machine including an electric motor, a housing surrounding the motor, and a pinion connected to the motor, at least one of the motor and the housing comprising a magnetically active portion of the machine, wherein the magnetically active motor portion is made of an enhanced performance steel material having a flux density at a given magnetizing force level that is at least about 20% less than the flux density at the given magnetic force level of a conventional low carbon steel material chosen from the group consisting of AISI 1008 and AISI 1010 steel.

20 Claims, 8 Drawing Sheets

STARTER MACHINE PERFORMANCE IMPROVEMENT

CROSS-REFERENCE TO RELATED APPLICATION(S)

This application claims the benefit under Title 35, U.S.C. §119(e) of U.S. Provisional Patent Application Ser. No. 61/668,919 entitled STARTER MACHINE SYSTEM AND METHOD, filed on Jul. 6, 2012, the entire disclosure of which is expressly incorporated herein by reference.

BACKGROUND

The present disclosure relates to rotary electric machines such as vehicle engine starter machines including electric motors, and particularly starter machines used in change of mind start-stop applications.

Recent requests by vehicle manufacturers for start-stop engine starter systems are specifying a warm start requirement for high speed operation in addition to the traditional cold start requirements of high torque, lower speed operation of the starter machine. A typical cold start (Conventional Start) condition is identified in the graph of FIG. 4 entitled "Start-Stop Starter Motor Enhancement." Due to their occurrence at higher than usual cranking speeds, these warm start points, can be difficult to accommodate with traditional starter motor designs, which were intended to perform under cold start conditions. A typical warm start (Stop-Start) condition is identified in FIG. 4. Conventional and/or historical approaches to augment the output of the starter motor have included modifications providing flux weakening, winding pattern shifting, or even mechanical gear shifting, which add cost and/or complexity, and may compromise performance of the starter under cold start conditions. It is desirable to enhance performance of the starter motor in the starter machine's high speed region (or low torque region) in simpler, less costly ways.

SUMMARY

The present disclosure provides an approach to enhancing electric machine performance that is more subtle and less invasive to existing machine designs than prior approaches, and yields a significant shift in electric machine performance. The approach hereby disclosed notably provides a substantive performance improvement in the high speed region of a starter motor, herein employed as an example electric machine embodiment.

In accordance with the present disclosure, non-traditional or non-conventional steel is used in the magnetically active portions of the starter machine. At low starter motor speeds, such as typically encountered during cold start conditions, i.e., when an engine is cranked from a non-rotating or relatively low rotating speed, high torque is demanded of the starter. Therefore, in this low speed region it is desirable for the magnetically active steel to yield a high flux density, or B value, for a given magnetizing force level, or H value. Generally, low carbon steels traditionally or conventionally used in the active magnetic portions of starter motors (e.g., AISI 1008 and AISI 1010 steel) suitably accommodate the cranking needs under cold start conditions.

However, at high starter motor speeds, such as typically encountered during warm start conditions, i.e., when an engine is cranked from relatively higher rotating speeds, as during change of mind start-stop operation, relatively lower torque is required of the starter. In accordance with the present disclosure, the starter motor performance is boosted in this high speed region through the use of a steel material having a LOWER flux density (B value) at a given level of magnetizing force (H value), which lowers the back electromotive force (EMF) of the motor and results in higher motor operating speeds. This increase in motor speed consequently produces a higher performance curve in this warm starting or high speed region.

To demonstrate this concept, a starter motor has been modeled that uses a conventional low carbon (AISI 1008, AISI 1010) steel material, typically used in starter machines, in the magnetically circuit of the machine, as shown by the dash-dot line in the graph of FIG. 5, entitled "Impact of BH Curve on Motor Performance." Next an enhanced performance steel material was modeled that is represented by the solid lines in the graphs of FIGS. 4-6. The modeled enhanced performance steel is based loosely on real world materials, and its consequent impact on performance relative to the conventional steel is apparent through comparison of their curves. In FIGS. 4 and 5, the regions of the graphs in which the respective curves for Original Performance or Conventional Steel, and for Enhanced Performance or Enhanced Performance Steel substantially coincide are herein referred to as the low speed region or the high torque region; and the regions of the graphs in which these curves are mutually divergent are herein referred to as the high speed region or the low torque region. As shown, these regions are adjacent along the range of motor operating speeds. Notably, although the scaling of FIGS. 4 and 5 differ, their curves demonstrate consistency of the relationship between the modeled results.

As can be seen in FIG. 5, in the low torque, high speed region the performance of a motor using the modeled enhanced performance steel is significantly improved. Samples of conventional starter steel material and modeled enhanced performance steel material are represented by the graphed BH curves of FIG. 6. The typical or conventional starter steel represented in FIG. 6 is hot rolled or cold rolled low carbon steel (e.g., AISI 1010 or AISI 1008 steel) commonly used across a wide variety of electrical machines. The enhanced performance steel material represented in FIG. 6 is an example of a group of performance enhancing materials having a comparatively lower flux density at a given level of magnetizing force. Such materials exhibit the trait of producing a comparatively lower motor back EMF, which consequently results in higher motor operating speeds and higher motor performance in the warm starting region. Materials included in the performance enhancing material group are each characterized by the flux density (B) of the enhanced performance steel being at least 20% below the flux density (B) of a conventional low carbon steel typically used in such electric machines, both at a given magnetizing force level (H). As shown, the magnetizing force value may be less than approximately 100 ampere-turns/inch.

The present disclosure provides a method of improving the performance of a rotary electric machine, operable in a low speed region and in a comparatively higher-speed high speed region, for machine operation in the high speed region. The method includes, between a first steel material having a first flux density at a given magnetizing force level, and a second steel material having a second flux density at the given magnetizing force level that is at least about 20% less than the first flux density, selecting the second steel material for use as a magnetically active portion of the machine. Consequently, machine operation at a given speed in the low speed region causes the machine comprising the magnetically active portion using the second steel material to generate a back EMF that is substantially similar to the back EMF that would be generated by the machine were the first steel material used instead of the second steel material for the magnetically active machine portion, and machine operation at a given speed in the high speed region causes the machine comprising the magnetically active portion using the second steel material to generate a back EMF that is substantially less than the back EMF that would be generated by the machine were the first steel material used instead of the second steel material for the magnetically active machine portion.

A further aspect of the method is that the given magnetizing force level is less than approximately 100 ampere-turns/inch.

A further aspect of the method is that the low speed region and the high speed region are adjacent regions along a range of machine operational speeds.

A further aspect of the method is that the machine includes an electric motor and, at the given speed of machine operation in the high speed region, the comparatively lesser back EMF generated by the machine comprising the magnetically active portion using the selected second steel material, relative to the back EMF that would be generated by the machine were the first steel material used instead of the selected second steel material for the magnetically active machine portion, is manifested by a comparatively higher motor output torque level.

A further aspect of the method is that it is also a method of improving the performance of an electric machine, operable in a high torque region and in a comparatively lower-torque low torque region, for machine operation in the low torque region. Consequently, relative to machine operation at a given torque level in the high torque region, the back EMF generated by the machine comprising the magnetically active portion using the selected second steel material is substantially similar to the back EMF that would be generated by the machine were the first steel material used instead of the selected second steel material for the magnetically active machine portion, and, relative to machine operation at a given torque in the low torque region, the back EMF generated by the machine comprising the magnetically active portion using the selected second steel material is substantially less than the back EMF that would be generated by the machine were the first steel material used instead of the selected second steel material for the magnetically active machine portion.

A further aspect of the method is that the machine includes an electric motor and, at the given torque level in the low torque region, the comparatively lesser back EMF produced by the machine comprising the magnetically active portion using the selected second steel material, relative to the back EMF that would be generated by the machine were the first steel material used instead of the selected second steel material for the magnetically active machine portion, is manifested by a comparatively higher motor output speed.

Another aspect of the method is that the machine is a starter machine in which the motor is connected to a pinion that is engageable with an engine ring gear that is rotatable at varying speeds, and the engine is capable of being cranked by the starter machine under cold start conditions during machine operation in the low speed or high torque region, and under warm start conditions during machine operation in the high speed or low torque region. Consequently, the engine is capable of being cranked under warm start conditions at comparatively higher speed and/or higher torque by the starter machine including the magnetically active machine portion using the selected second steel material, relative to the speed and/or torque at which the engine would be cranked by the starter machine were the first steel material used instead of the selected second steel material for the magnetically active machine portion.

Another aspect of the method is that the motor comprises the magnetically active machine portion for which the selected second steel material is used.

A further aspect of the method is that the first steel material is a low carbon steel.

Another aspect of the method is that the first steel material is selected from the group consisting of AISI 1008 steel and AISI 1010 steel.

The present disclosure also provides, in combination with a rotary electric starter machine operable in a low speed region and a comparatively higher-speed high speed region for cranking an engine under cold start and warm start conditions, respectively, and which includes an electric motor, a housing surrounding the motor, and a pinion connected to the motor and engageable with an engine ring gear, wherein at least one of the motor and the housing includes a magnetically active portion of the machine, an improvement. The improvement includes using for the magnetically active machine portion an enhanced performance steel material having a flux density at a given magnetizing force level that is at least about 20% less than the flux density at the given magnetic force level of a conventional low carbon steel material chosen from the group consisting of AISI 1008 and AISI 1010 steel. Consequently, operation of the machine at a given speed in the low speed region causes the machine to generate a back EMF that is substantially similar to the back EMF that would be generated by the machine were the conventional low carbon steel material used instead of the enhanced performance steel material for the magnetically active machine portion, and whereby operation of the machine at a given speed in the high speed region causes the machine to generate a back EMF that is substantially less than the back EMF than would be generated by the machine were the conventional low carbon steel material used instead of the enhanced performance steel material for the magnetically active machine portion.

A further aspect of the combination is that the given magnetizing force level is less than approximately 100 ampere-turns/inch.

A further aspect of the combination is that the low speed region and the high speed region are adjacent regions along a range of machine operational speeds.

A further aspect of the combination is that at the given speed of machine operation in the high speed region, the comparatively lesser back EMF generated by the machine comprising the magnetically active portion using the enhanced performance steel material, relative to the back EMF that would be generated by the machine were the conventional low carbon steel material used instead of the enhanced performance steel material for the magnetically active machine portion, is manifested by a comparatively higher motor output torque level.

A further aspect of the combination is that the machine is operable in a high torque region and a comparatively lower-torque low torque region, which respectively correspond to the low speed and high speed regions. Consequently, relative to machine operation at a given torque level in the high torque region, the back EMF generated by the machine comprising the magnetically active portion using the enhanced performance steel material is substantially similar to the back EMF that would be generated by the machine were the conventional low carbon steel material used instead of the enhanced performance steel material for the magnetically active machine portion. Also consequently, relative to machine operation at a given torque in the low torque region, the back EMF generated by the machine comprising the magnetically active portion using the enhanced performance steel material is substantially less than the back EMF that would be generated by the machine were the conventional low carbon steel material used instead of the enhanced performance steel material for the magnetically active machine portion.

Another aspect of the combination is that the comparatively lesser back EMF produced by the machine comprising the magnetically active portion using the enhanced performance steel material at the given torque level in the low torque region, relative to the back EMF that would be generated by the machine were the conventional low carbon steel material used instead of the enhanced performance steel material for the magnetically active machine portion, is manifested by a comparatively higher motor output speed.

An additional aspect of the combination is that the engine is capable of being cranked under warm start conditions at comparatively higher speed and/or higher torque by the machine including the magnetically active machine portion using the enhanced performance steel material, relative to the speed and/or torque at which the engine would be cranked by the machine were the conventional low carbon steel material used instead of the enhanced performance steel material for the magnetically active machine portion.

An additional aspect of the combination is that the motor includes the magnetically active machine portion for which the enhanced performance steel material is used.

The present disclosure also provides a rotary electric starter machine including an electric motor, a housing surrounding the motor, and a pinion connected to the motor. At least one of the motor and the housing include a magnetically active portion of the machine. The magnetically active motor portion is made of an enhanced performance steel material having a flux density at a given magnetizing force level that is at least about 20% less than the flux density at the given magnetic force level of a conventional low carbon steel material chosen from the group consisting of AISI 1008 and AISI 1010 steel.

A further aspect of the machine is that the given magnetizing force level is less than approximately 100 ampere-turns/inch.

BRIEF DESCRIPTION OF THE DRAWINGS

The above-mentioned aspects and other characteristics and advantages of an apparatus and/or method according to the present disclosure will become more apparent and will be better understood by reference to the following description of exemplary embodiments taken in conjunction with the accompanying drawings, wherein.

Figure 1:
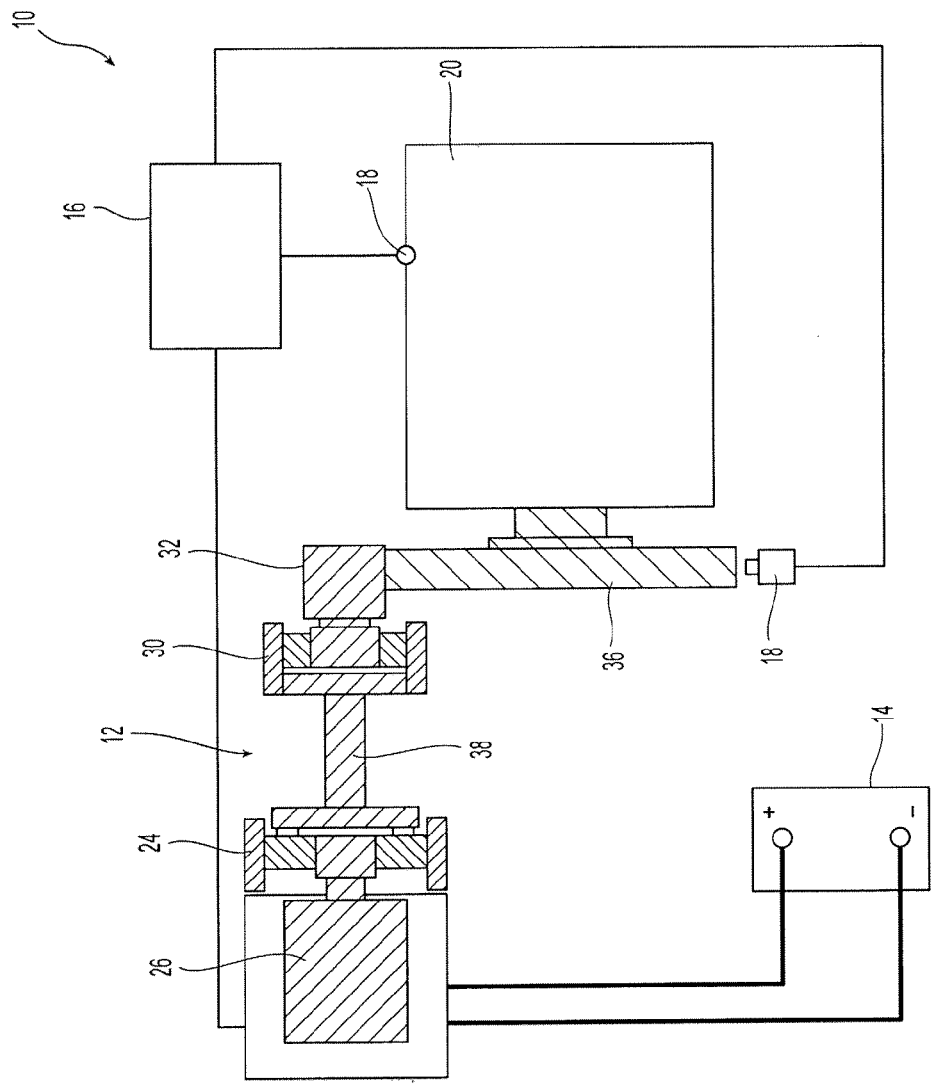
FIG. 1 is a diagram of a machine control system according to one embodiment of the present disclosure.

Corresponding reference characters indicate corresponding parts throughout the several views. Although the drawings represent embodiments of the disclosed apparatus and method, the drawings are not necessarily to scale or to the same scale and certain features may be exaggerated or omitted in order to better illustrate and explain the present disclosure. Moreover, in accompanying drawings that show sectional views, cross-hatching of various sectional elements may have been omitted for clarity. It is to be understood that this omission of cross-hatching is for the purpose of clarity in illustration only.

DETAILED DESCRIPTION

The embodiments described below are not intended to be exhaustive or to limit the present disclosure to the precise forms or steps disclosed in the following detailed description. Rather, the embodiments are chosen and described so that others skilled in the art may appreciate and understand the principles and practices of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize that the examples provided herein have many useful alternatives which fall within the scope of embodiments of the invention.

FIG. 1 illustrates a starter machine control system 10 according to one embodiment of the invention. The system 10 can include an electric machine 12, a power source 14, such as a battery, an electronic control unit 16, one or more sensors 18, and an engine 20, such as an internal combustion engine. In some embodiments, a vehicle, such as an automobile, can comprise the system 10, although other vehicles can include the system 10. In some embodiments, non-mobile apparatuses, such as stationary engines, can comprise the system 10.

The electric machine 12 can be, without limitation, an electric motor, such as a hybrid electric motor, an electric generator, a starter machine, or a vehicle alternator. In one embodiment, the electric machine can be a High Voltage Hairpin (HVH) electric motor or an interior permanent magnet electric motor for hybrid vehicle applications.

Figure 2A:
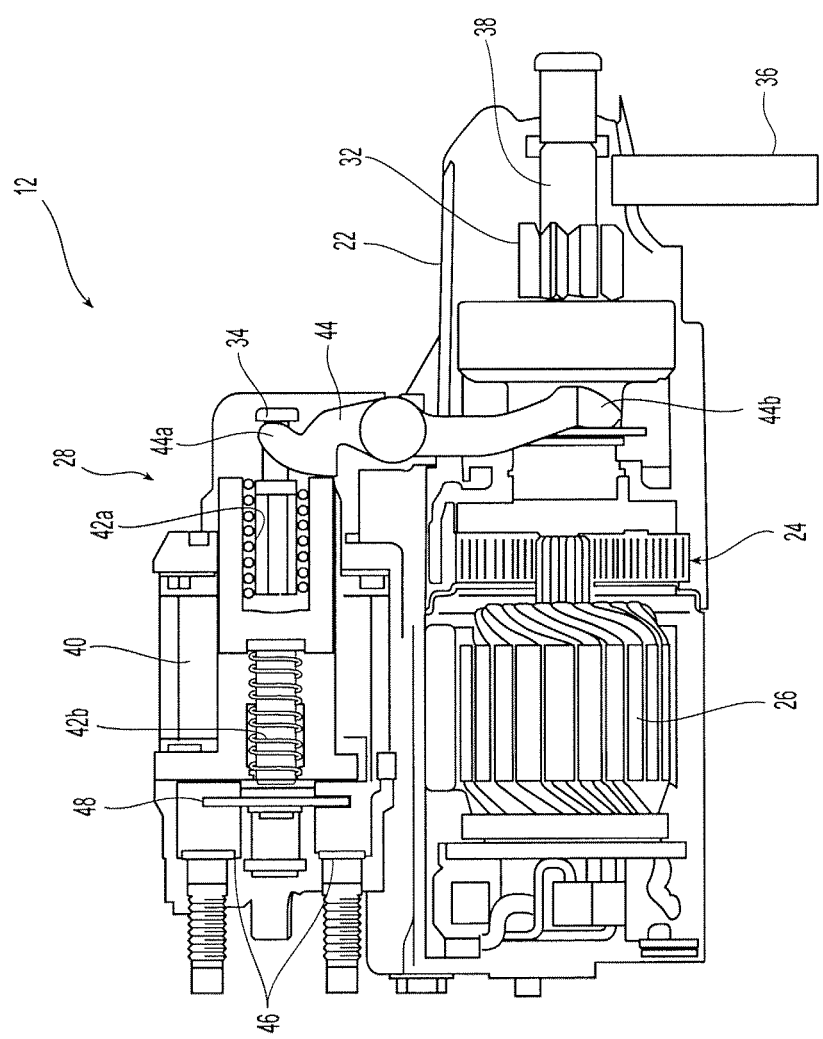
FIGS. 2A and 2B are cross-sectional views of starter machines according to some embodiments of the present disclosure.
Figure 2B:
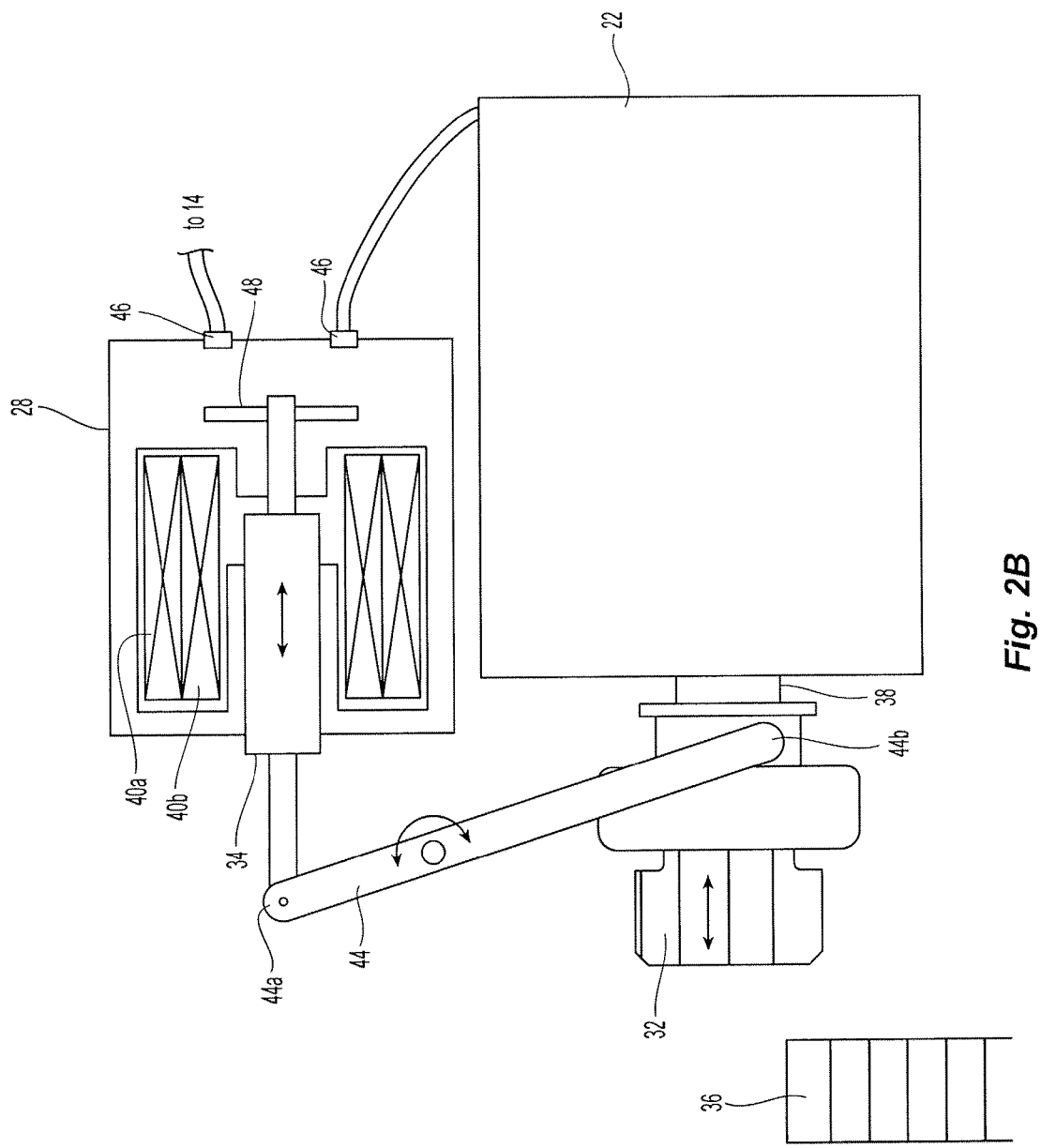

As shown in FIGS. 2A and 2B, in some embodiments, the electric machine 12 can comprise a starter machine 12. In some embodiments, the starter machine 12 can comprise a housing 22, a gear train 24, a brushed or brushless motor 26, a solenoid assembly 28, a clutch 30 (e.g., an overrunning clutch), and a pinion 32. In some embodiments, the starter machine 12 can operate in a generally conventional manner. For example, in response to a signal (e.g., a user closing a switch, such as an ignition switch), the solenoid assembly 28 can cause a plunger 34 to move the pinion 32 into an engagement position with a ring gear 36 of a crankshaft of the engine 20. Further, the signal can lead to the motor 26 generating an EMF, which can be translated through the gear train 24 to the pinion 32 engaged with the ring gear 36. As a result, in some embodiments, the pinion 32 can move the ring gear 36, which can crank the engine 20, leading to engine 20 ignition. Further, in some embodiments, the clutch 30 can aid in reducing a risk of damage to the starter machine 12 and the motor 26 by disengaging the pinion 32 from a shaft 38 connecting the pinion 32 and the motor 26 (e.g., allowing the pinion 32 to free spin if it is still engaged with the ring gear 36).

In some embodiments, the starter machine 12 can comprise multiple configurations. For example, in some embodiments, the solenoid assembly 28 can comprise one or more configurations. In some embodiments, the solenoid assembly 28 can comprise the plunger 34, a coil winding 40, and a plurality of biasing members 42 (e.g., springs or other structures capable of biasing portions of the solenoid assembly 28). In some embodiments, a first end 44a of a shift lever 44 can be coupled to the plunger 34 and a second end 44b of the shift lever 44 can be coupled to the pinion 32 and/or a shaft 38 that can operatively couple together the motor 26 and the pinion 32. As a result, in some embodiments, at least a portion of the movement created by the solenoid assembly 28 can be transferred to the pinion 32 via the shift lever 44 to engage the pinion 32 with the ring gear 36, as previously mentioned.

Figure 3A:
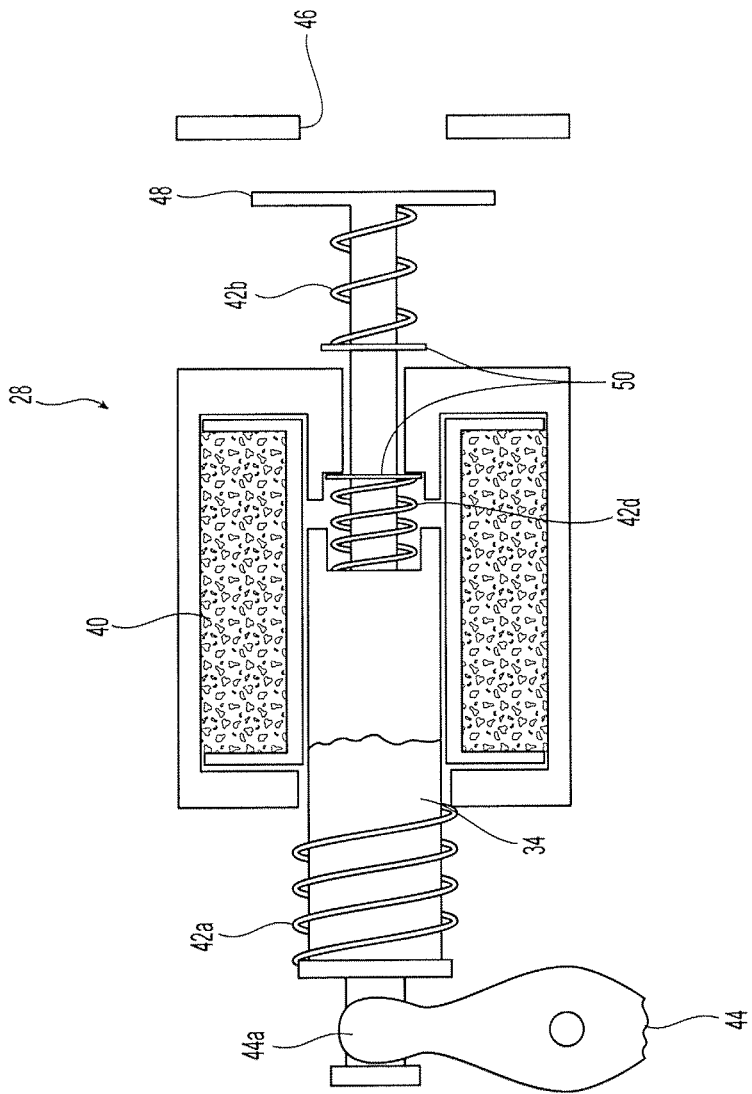
FIGS. 3A and 3B are cross-sectional views of solenoid assemblies according to some embodiments of the present disclosure.
Figure 3B:
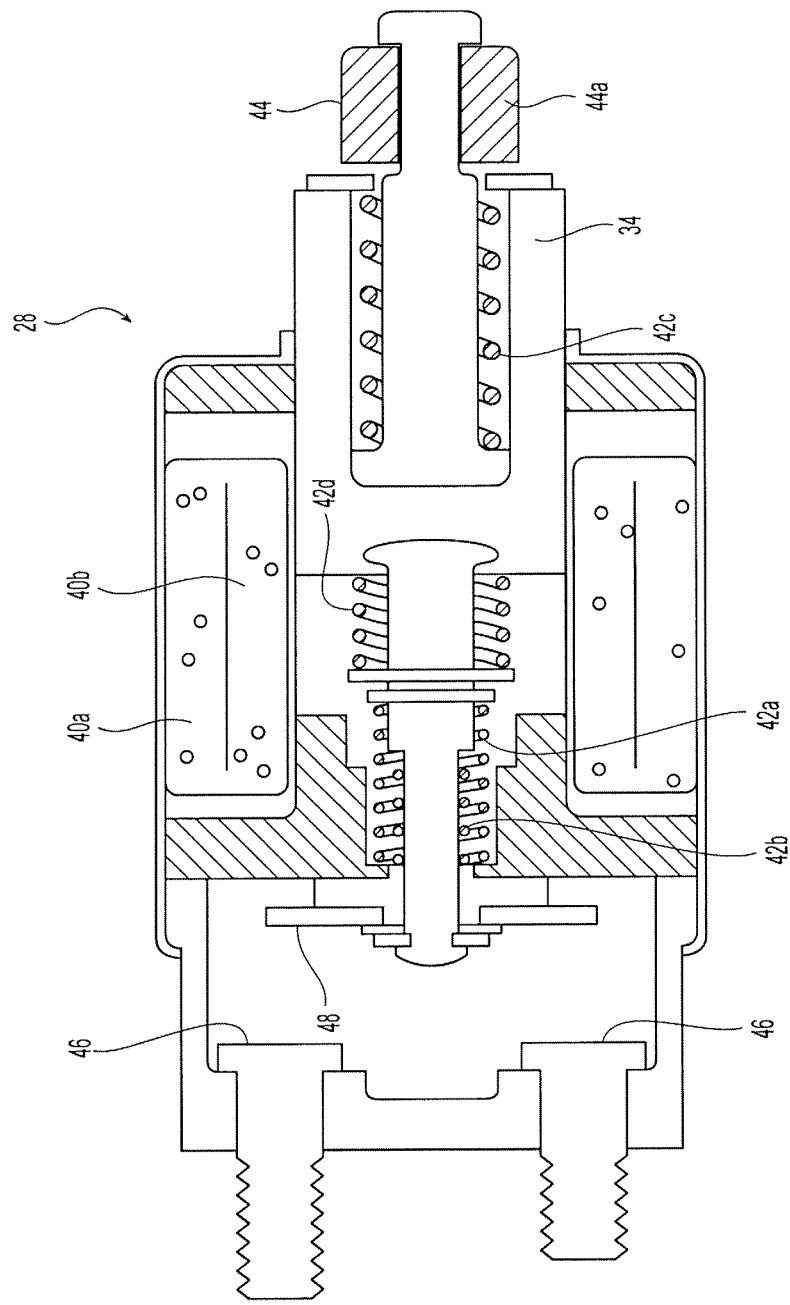

Moreover, as shown in FIGS. 3A and 3B, the solenoid assembly 28 can comprise at least a plunger-return biasing member 42a and a contact over-travel biasing member 42b. When the starter machine 12 is activated (e.g., by the user closing the ignition switch), the system 10 can energize the coil winding 40, which can cause movement of the plunger 34 (e.g., in a generally axial direction). For example, current flowing through the coil winding 40 can draw-in or otherwise move the plunger 34, and this movement can be translated to engagement of the pinion 32, via the shift lever 44 (i.e., the magnetic field created by current flowing through coil winding 40 can cause the plunger 34 to move). Moreover, the plunger 34 moving inward as a result of the energized coil winding 40 can at least partially compress the plunger-return biasing member 42a.

Additionally, in some embodiments, the plunger 34 can be drawn-in or otherwise moved to a position (e.g., an axially inward position) so that at least a portion of the plunger 34 (e.g., a lateral end of the plunger 34) can at least partially engage or otherwise contact one or more contacts 46 to close a circuit that provides current to the motor 26 from the power source 14. As a result, the motor 26 can be activated by the current flowing through the circuit closed by the plunger 34. For example, in some embodiments, the plunger 34 can comprise a plunger contact 48 that can engage the contacts 46 to close the circuit to enable current to flow to the motor 26. In some embodiments, the contact over-travel biasing member 42b can be coupled to and/or disposed over at least a portion of the plunger 34 at a position substantially adjacent to the plunger contact 48, as shown in FIG. 3. In some embodiments, the contact over-travel biasing member 42b can function to assist the plunger-return biasing member 42a in returning the plunger 34 to the home position. Additionally, in some embodiments, the contact over-travel biasing member 42b can also function to assist in separating the plunger contact 48 and the contacts 46 (e.g., the biasing force of the compressed contact over-travel biasing member 42b can aid in moving the plunger contact 48 away from the contacts 46).

In some embodiments, after partial or total completion of the starting event (e.g., the engine has at least partially turned over and combustion has begun), the coil winding 40 can be at least partially de-energized. In some embodiments, the reduction or removal of force retaining the plunger 34 in place (e.g., the magnetic field created by current flowing through the coil winding 40) can enable the compressed plunger-return biasing member 42a to expand. As a result, the plunger-return biasing member 42a can expand and return the plunger 34 to its original position before the initial energization of the coil winding 40 (i.e., a "home" position). Accordingly, the pinion 32 can be withdrawn from the ring gear 36 and return to its original position within the housing 22. Additionally, as shown in FIG. 3B, in some embodiments, the solenoid assembly 28 can also comprise a drive-return biasing member 42c that can be configured and arranged to further aid in returning the plunger 34 to the home position.

Figure 4:
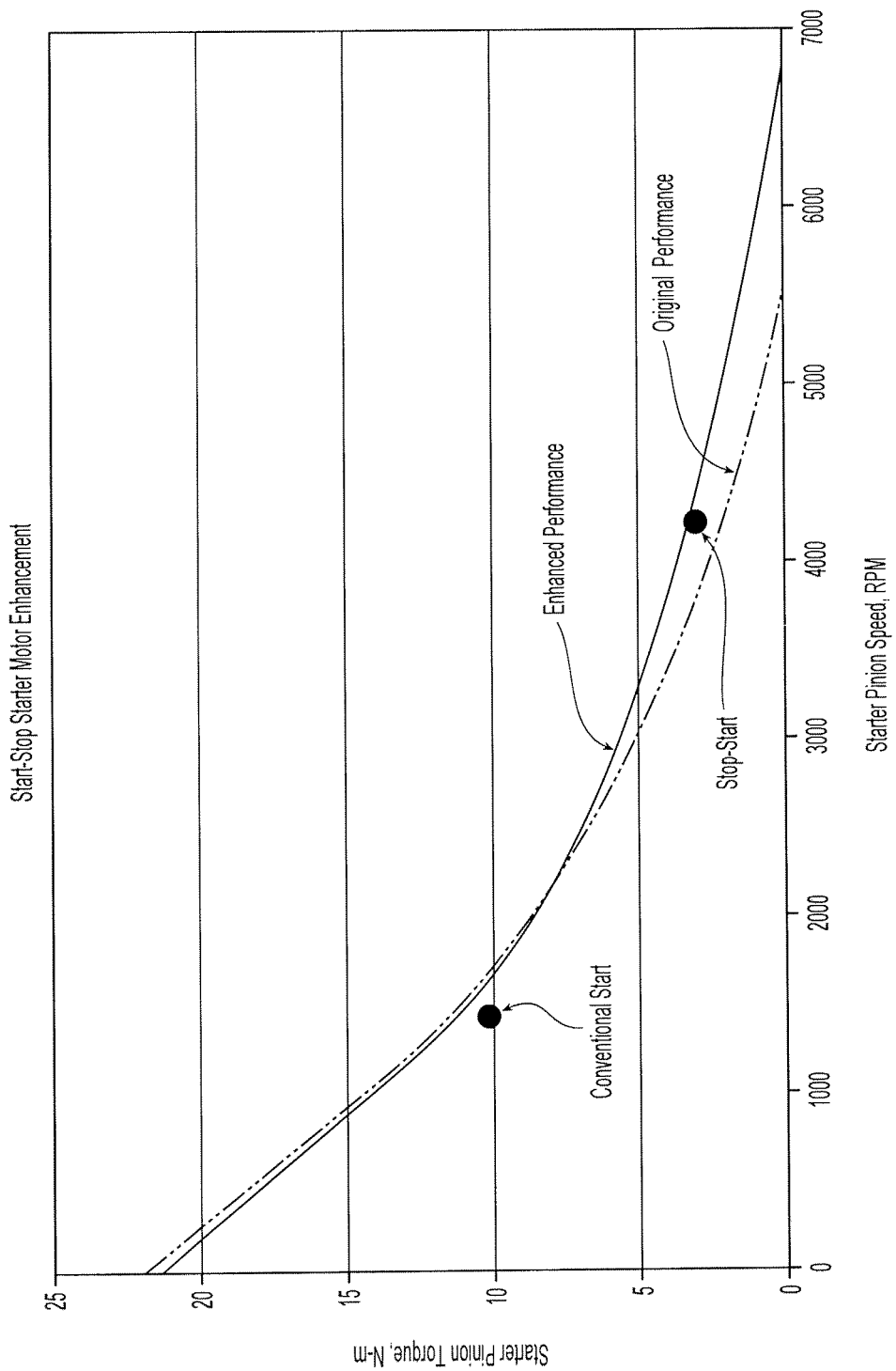
FIG. 4 is a graph showing a starting episode requirements relative to starter machine pinion torque and speed according to one embodiment of the present disclosure.

As shown in FIGS. 2B, 3B, and 4, in some embodiments, the solenoid assembly 28 can comprise more than one coil winding 40. For example, as shown in FIGS. 2B, 3B, and 4, the solenoid assembly 28 can comprise two coil windings 40. In other embodiments, the solenoid assembly 28 can comprise more than two coil windings 40 (not shown). In some embodiments, a first coil winding 40a can be configured and arranged to move the plunger 34 from the home position (i.e., a position occupied by the plunger 34 when little to no current flows through any of the coil windings 40) to the artificial stopping point. For example, current flowing through the first coil winding 40a can create a magnetic field sufficient to move the plunger 34 from the home position to the artificial stop, but the magnetic field can be of a magnitude that is insufficient to overcome the resistive force of the auxiliary biasing member 42d. As a result, activation of the first coil winding 40a can move the plunger 34 to the artificial stop, but in some embodiments, the plunger contact 48 will not engage the contacts 46 to close the circuit.

In some embodiments, the coil winding 40 can comprise a second coil winding 40b. The second coil winding 40b can be configured and arranged to move the plunger 34 from the artificial stop to a position where the plunger contacts 48 can engage the contacts 46 to close the circuit and provide current from the power source 14 to the motor 26. For example, current flowing through the second coil winding 40b can create a magnetic field sufficient to move the plunger 34 from the artificial stop to a position where the plunger contact 48 can engage the contacts 46. In some embodiments, the first coil winding 40a can be deactivated before and/or after activation of the second coil winding 40b. Additionally, in some embodiments, the second or the first coil winding 40a, 40b can comprise a magnetic field of sufficient magnitude to overcome the resistive force of the auxiliary biasing member 42d so that only one coil winding 40 needs to be used. Moreover, in some embodiments, the solenoid assembly 28 can function without the auxiliary biasing member 42d so that either the first coil winding 40a or the second coil winding 40b would be needed to engage the plunger contact 48 and the contacts 46 to close the circuit. As shown in FIGS. 2B and 3B, in some embodiments, the coil windings 40a, 40b can be at least partially co-radially arranged so that one of the coil windings 40 (e.g. the first coil winding 40*a*) can at least partially circumscribe the other coil winding 40 (e.g., the second coil winding 40*b*).

In some embodiments, the coil windings 40*a*, 40*b* can comprise other configurations. In some embodiments, the coil windings 40*a*, 40*b* can function as conventional coil windings 40*a*, 40*b*. Regardless of the number and/or configuration of biasing members 42, the first coil winding 40*a* can be configured and arranged to function as a "pull-in" coil winding 42 and the second coil winding 40*b* can be configured and arranged to function as a "hold-in" coil winding 42, or vice versa. For example, the first coil winding 40*a* can be initially activated by the electronic control unit 16 to initially move the plunger 34 from the home position. In some embodiments, the solenoid assembly 28 can operate without the auxiliary biasing member 42*d*, and as a result, the first coil winding 40*a* can move the plunger 36 until the contacts 46, 48 engage to close the circuit (i.e., the first coil winding 40*a* can function to initially "pull-in" the plunger 34) and to move the pinion 32 into engagement with the ring gear 36. In some embodiments, the second coil winding 40*b* can be activated upon the contacts 46, 48 engaging or another signal resulting from the plunger 34 moving. Upon activation, the second coil winding 40*b* can function to retain or "hold-in" the plunger 36 during a starting episode. Moreover, during activation of the second coil winding 40*b*, the solenoid assembly 28 can be configured and arranged so that the first coil winding 40*a* is substantially or completely deactivated by the activation of the second coil winding 40*b*. For example, the second coil winding 40*b* can comprise a greater resistance and, as a result, a lesser current relative to the first coil winding 40*a*. Accordingly, the second coil winding 40*b* can operate at a lower temperature relative to the first coil windings 40*a*, and, as a result, can operate for longer periods of time because of the lesser thermal output by the winding 40*b*. In some embodiments, after the engine 20 has been started, the second coil winding 40*b* can be substantially or completely deactivated and the plunger-return biasing member 42*a* can move the plunger 34 back to the home position.

In some embodiments, the coil windings 40*a*, 40*b* can be coupled to and/or in communication with the electronic control unit 16 and the power source 14. For example, as previously mentioned, current can circulate through the coil windings 40*a*, 40*b* to move the plunger 34, and, as a result, move the pinion 32 toward the ring gear 36. In some embodiments, the current circulating through the coil windings 40*a*, 40*b* can originate from the power source 14 (e.g., the battery). Moreover, in some embodiments, the electronic control unit 16 can control the current flow to one, some, or all of the coil windings 40*a*, 40*b* from the power source 14 so that the plunger 34 moves upon the electronic control unit 16 transmitting the necessary signals for current to flow to the coil windings 40*a*, 40*b*.

In some embodiments, one or more of the sensors 18 can comprise an engine speed sensor 18. For example, the engine speed sensor 18 can detect and transmit data to the electronic control unit 16 that correlates to the speed of the engine 20, the crankshaft, and/or the ring gear 36. In some embodiments, the engine speed sensor 18 can communicate with the electronic control unit 16 via wired and/or wireless communication protocols.

In addition to the conventional engine 20 starting episode (i.e., a "cold start" starting episode) previously mentioned, the starter machine control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving).

Moreover, in some embodiments, in addition to, or in lieu of being configured and arranged to enable a stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been deactivated, but continues to move (i.e., the engine 20 is decelerating). For example, after the engine receives a deactivation signal, but before the engine 20 substantially or completely ceases moving, the user can decide to reactivate the engine 20 so that the pinion 32 engages the ring gear 36 as the ring gear 36 is decelerating, but continues to move (e.g., rotate). After engaging the ring gear 36, the motor 26 can restart the engine 20 via the pinion 32 engaged with the ring gear 36. In some embodiments, the control system 10 can be configured for other starting episodes, such as a conventional "soft start" starting episodes (e.g., the motor 26 is at least partially activated during engagement of the pinion 32 and the ring gear 36).

The following discussion is intended as an illustrative example of some of the previously mentioned embodiments employed in a vehicle, such as an automobile, during a starting episode. However, as previously mentioned, the control system 10 can be employed in other structures for engine 20 starting.

As previously mentioned, in some embodiments, the control system 10 can be configured and arranged to start the engine 20 during a change of mind stop-start starting episode. For example, after a user cold starts the engine 20, the engine 20 can be deactivated upon receipt of a signal from the electronic control unit 16 (e.g., the vehicle is not moving and the engine 20 speed is at or below idle speed, the vehicle user instructs the engine 20 to inactivate by depressing a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the electronic control unit 16 (e.g., via releasing the brake pedal, depressing the acceleration pedal, etc.). After receiving the signal, the electronic control unit 16 can use at least some portions of the starter machine control system 10 to restart the engine 20. For example, in order to reduce the potential risk of damage to the pinion 32 and/or the ring gear 36, a speed of the pinion 32 can be substantially synchronized with a speed of the ring gear 36 (i.e., a speed of the engine 20) when the starter machine 12 attempts to restart the engine 20.

During a conventional starting episode or event, the pinion 32 can operate at a relatively low rotational speed and at a higher torque (e.g., relative to a change of mind stop-start starting episode) because the pinion 32 must move a stationary ring gear 36, which can require a significant amount of torque. However, during a change of mind stop-start starting episode, the pinion 32 can start the engine 20 with lesser torque (e.g., relative to a conventional starting episode) and at greater pinion 32 rotational speed because the ring gear 36 can already be moving. Some conventional attempts to augment the output of the starter machine 12 to better accommodate change of mind start-stop operation include flux weakening, winding pattern shifting, and/or the inclusion of a transmission within the starter machine 12. For example, as shown in the graph of FIG. 4, a curve of a torque to speed ratio illustrates the differences in requirements for a conventional starting episode and a change of mind stop-start starting episode. As shown in FIG. 4, the torque to speed ratio is greater for conventional starting episodes than for change of mind stop-start starting episodes which occur at relatively higher starter motor and pinion, and engine ring gear speeds.

In some embodiments, one or more properties of components of at least a portion of the starter machine 12 components can impact operations of the system 10. For example, in some embodiments, materials selected for use in formation, assembly, and/or construction of the housing 22 (i.e., the frame), the motor 26 (e.g., including conventional portions of the motor 26, such as laminations), or any other portion of the machine 12 can at least partially impact operations of the system 10. Constituents of active magnetic circuit portions (e.g., some or all of the housing 12 and/or the motor 26) of the electric machine 12 can impact electric machine 12 operations. For example, some electric machines 12 can comprise conventional metals (e.g., AISI 1008 and/or AISI 1010 steel) that can be purchased and incorporated at less expense to the manufacturer and/or end user. In some embodiments, altering the composition of some portions of the electric machine 12 can alter performance of the starter machine system 10 enable improved conventional and/or change of mind stop-start starting events (e.g., reach different torque to speed ratios).

In some embodiments, at least some portions of the electric machine 12 can comprise non-conventional constituents that can augment and/or improve electric machine 12 performance. For example, the housing 12 and/or the motor 26 can comprise non-conventional steel elements that can improve performance curves (hereinafter "enhanced performance") relative to conventional steel elements (hereinafter "original performance"). In some embodiments, by altering the active magnetic circuit path adjacent to and including the motor 26, the enhanced performance starter machine 12 can produce outputs that are able to function to start the engine 20 under both conventional and change of mind stop-start starting episodes. As shown in FIG. 4, modeling starter machines 12 (e.g., modeled on real-world materials and their related properties) comprising conventional and non-conventional steel components reveals that the enhanced performance machines 12 can output the necessary ratios of torque to speed to start engines 20 during both conventional (for example, cold-start) and change of mind stop-start starting episodes, while the conventional, original performance machines 12 do not perform as well in the change of mind stop-start starting episodes, which are typically warm-start episodes.

Figure 5:
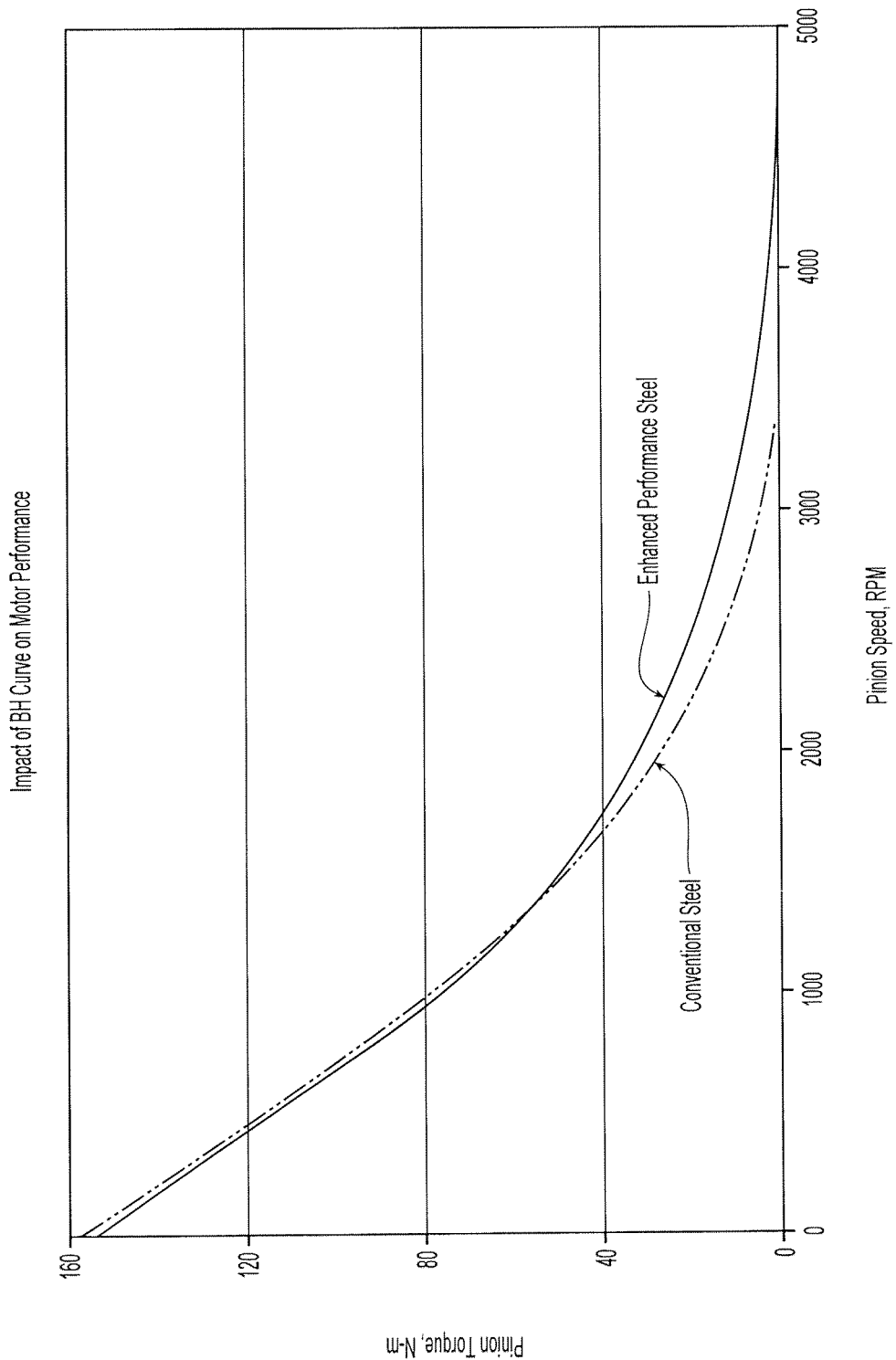
FIG. 5 is a graph showing modeled torque and speed performance relative to the use of a conventional steel and non-conventional steel in a starter motor according to one embodiment of the present disclosure.

Similarly, as shown in FIG. 5, modeling reveals that starter machines 12 comprising non-conventional steel elements yield greater amounts of torque at higher speeds (for example, during warm-start conditions) than can starter machines 12 comprising only conventional steel. For example, performance lines of the two steels remain on virtually the same BH (Flux Density and Magnetic Field Strength) curve until the pinion 32 torque output is at approximately 50 Newton-meters (N-m) and the pinion 32 rotational speed is at approximately 1400 Revolutions per Minute (RPM). At this point, the differences between the conventional and nonconventional steel begin to appear and become progressively more pronounced. The conventional steel can comprise hot-rolled and cold-rolled, low carbon metals that are commonly used across a wide variety of electrical machines (e.g., AISI 1008 and AISI 1010 steels). For the unique properties of the non-conventional steel to be effective, it was discovered that the resulting flux density of the non-conventional steel below a magnetic field strength or density of approximately 100 ampere-turns/inch should be at least 20% less than a conventional low carbon steel.

Figure 6:
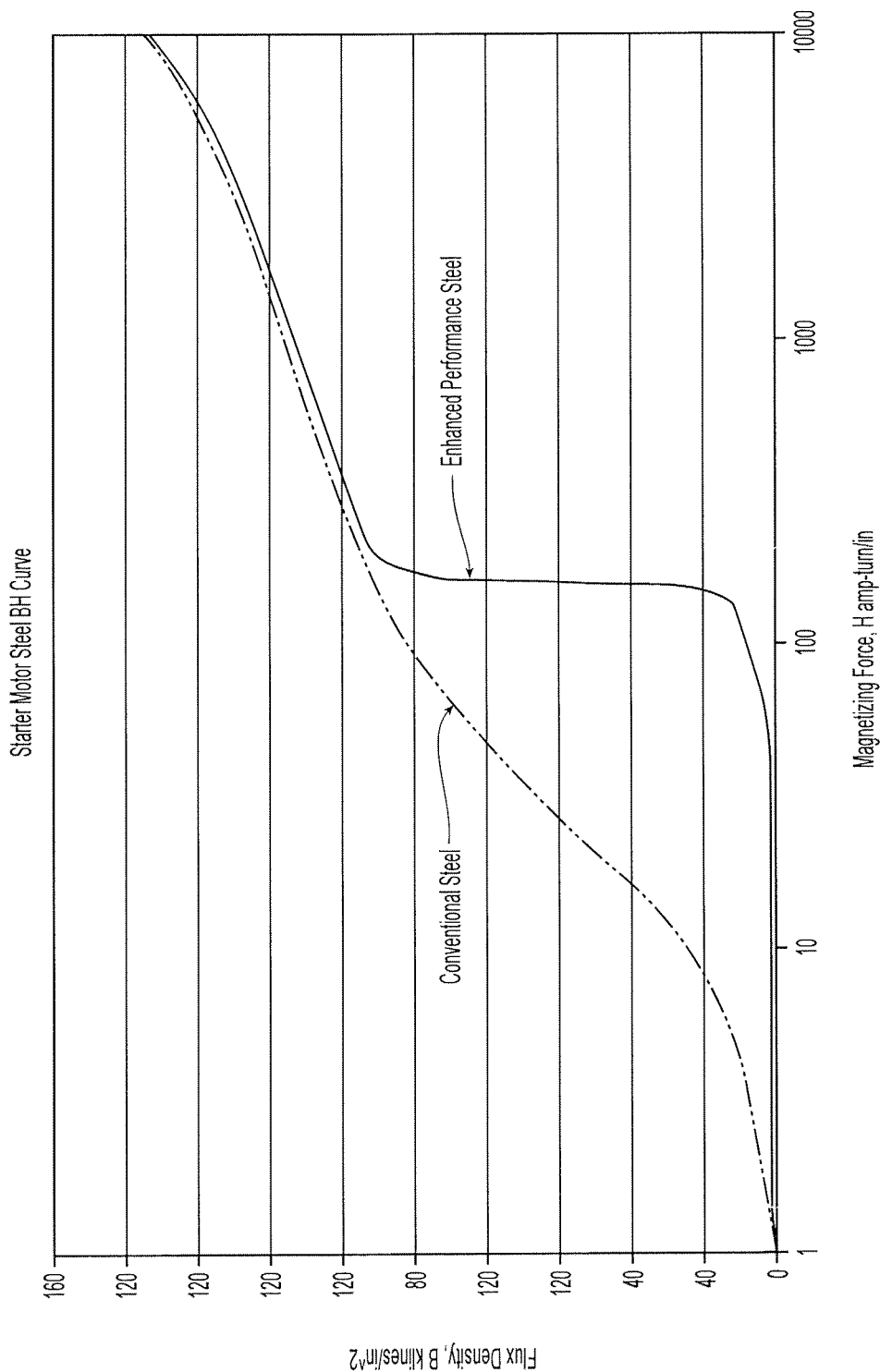
FIG. 6 is a graph showing modeled changes in flux density and magnetizing field according to one embodiment of the present disclosure.

As shown in FIG. 6, the enhanced performance steel can comprise different properties relative to the original performance steel. For example, during a conventional starting episode (i.e., high torque, low rotational speed), the amount of flux density (B) should be higher for a given magnetic field strength (H). Furthermore, during starting episodes similar to a change of mind stop-start starting episode (i.e., less torque is required, but the pinion 32 moves at higher rotational speeds), performance can be enhanced by using materials comprising a lesser flux density (B) at a given magnetizing force level (H). As a result of inclusion of the enhanced performance steel, the back EMF generated in a motor according to the present disclosure can be reduced relative to that generated in a similar motor including only conventional steel, which can result in greater operating rotational speeds. This can result in the production of greater performance and outputting the ratio of torque to speed necessary to achieve a successful change of mind stop-start starting episode.

While exemplary embodiments have been disclosed hereinabove, the present disclosure is not limited to the disclosed embodiments. Instead, this application is intended to cover any variations, uses, or adaptations of the present disclosure using its general principles. Further, this application is intended to cover such departures from the present disclosure as come within known or customary practice in the art to which this present disclosure pertains and which fall within the limits of the appended claims.

What is claimed is:

1. A method of improving the performance of a rotary electric machine, operable in a low speed region and in a comparatively higher-speed high speed region, for machine operation in the high speed region, comprising:

between a first steel material having a first flux density at a given magnetizing force level, and a second steel material having a second flux density at the given magnetizing force level that is at least about 20% less than the first flux density, selecting the second steel material for use as a magnetically active portion of the machine;

whereby machine operation at a given speed in the low speed region causes the machine comprising the magnetically active portion using the second steel material to generate a back EMF that is substantially similar to the back EMF that would be generated by the machine were the first steel material used instead of the second steel material for the magnetically active machine portion, and machine operation at a given speed in the high speed region causes the machine comprising the magnetically active portion using the second steel material to generate a back EMF that is substantially less than the back EMF that would be generated by the machine were the first steel material used instead of the second steel material for the magnetically active machine portion.

2. The method of claim 1, wherein the given magnetizing force level is less than approximately 100 ampere-turns/inch.

3. The method of claim 1, wherein the low speed region and the high speed region are adjacent regions along a range of machine operational speeds.

4. The method of claim 1, wherein the machine comprises an electric motor and, at the given speed of machine operation in the high speed region, the comparatively lesser back EMF generated by the machine comprising the magnetically active portion using the selected second steel material, relative to the back EMF that would be generated by the machine were the first steel material used instead of the selected second steel material for the magnetically active machine portion, is manifested by a comparatively higher motor output torque level.

5. The method of claim 1, wherein said method is also a method of improving the performance of an electric machine, operable in a high torque region and in a comparatively lower-torque low torque region, for machine operation in the low torque region, whereby, relative to machine operation at a given torque level in the high torque region, the back EMF generated by the machine comprising the magnetically active portion using the selected second steel material is substantially similar to the back EMF that would be generated by the machine were the first steel material used instead of the selected second steel material for the magnetically active machine portion, and, relative to machine operation at a given torque in the low torque region, the back EMF generated by the machine comprising the magnetically active portion using the selected second steel material is substantially less than the back EMF that would be generated by the machine were the first steel material used instead of the selected second steel material for the magnetically active machine portion.

6. The method of claim 5, wherein the machine comprises an electric motor and, at the given torque level in the low torque region, the comparatively lesser back EMF produced by the machine comprising the magnetically active portion using the selected second steel material, relative to the back EMF that would be generated by the machine were the first steel material used instead of the selected second steel material for the magnetically active machine portion, is manifested by a comparatively higher motor output speed.

7. The method of claim 6, wherein the machine is a starter machine in which the motor is connected to a pinion that is engageable with an engine ring gear that is rotatable at varying speeds, and the engine is capable of being cranked by the starter machine under cold start conditions during machine operation in the low speed or high torque region, and under warm start conditions during machine operation in the high speed or low torque region;

whereby the engine is capable of being cranked under warm start conditions at comparatively higher speed and/or higher torque by the starter machine including the magnetically active machine portion using the selected second steel material, relative to the speed and/or torque at which the engine would be cranked by the starter machine were the first steel material used instead of the selected second steel material for the magnetically active machine portion.

8. The machine of claim 6, wherein the motor comprises the magnetically active machine portion for which the selected second steel material is used.

9. The method of claim 1, wherein the first steel material is a low carbon steel.

10. The method of claim 9, wherein the first steel material is selected from the group consisting of AISI 1008 steel and AISI 1010 steel.

11. In combination with a rotary electric starter machine operable in a low speed region and a comparatively higher-speed high speed region for cranking an engine under cold start and warm start conditions, respectively, and which includes an electric motor, a housing surrounding the motor, and a pinion connected to the motor and engageable with an engine ring gear, wherein at least one of the motor and the housing includes a magnetically active portion of the machine, the improvement which comprises:

using for the magnetically active machine portion an enhanced performance steel material having a flux density at a given magnetizing force level that is at least about 20% less than the flux density at the given magnetic force level of a conventional low carbon steel material chosen from the group consisting of AISI 1008 and AISI 1010 steel;

whereby operation of the machine at a given speed in the low speed region causes the machine to generate a back EMF that is substantially similar to the back EMF that would be generated by the machine were the conventional low carbon steel material used instead of the enhanced performance steel material for the magnetically active machine portion, and whereby operation of the machine at a given speed in the high speed region causes the machine to generate a back EMF that is substantially less than the back EMF than would be generated by the machine were the conventional low carbon steel material used instead of the enhanced performance steel material for the magnetically active machine portion.

12. The combination of claim 11, wherein the given magnetizing force level is less than approximately 100 ampere-turns/inch.

13. The combination of claim 11, wherein the low speed region and the high speed region are adjacent regions along a range of machine operational speeds.

14. The combination of claim 11, wherein at the given speed of machine operation in the high speed region, the comparatively lesser back EMF generated by the machine comprising the magnetically active portion using the enhanced performance steel material, relative to the back EMF that would be generated by the machine were the conventional low carbon steel material used instead of the enhanced performance steel material for the magnetically active machine portion, is manifested by a comparatively higher motor output torque level.

15. The combination of claim 11, wherein the machine is operable in a high torque region and a comparatively lower-torque low torque region, which respectively correspond to the low speed and high speed regions;

whereby, relative to machine operation at a given torque level in the high torque region, the back EMF generated by the machine comprising the magnetically active portion using the enhanced performance steel material is substantially similar to the back EMF that would be generated by the machine were the conventional low carbon steel material used instead of the enhanced performance steel material for the magnetically active machine portion; and whereby, relative to machine operation at a given torque in the low torque region, the back EMF generated by the machine comprising the magnetically active portion using the enhanced performance steel material is substantially less than the back EMF that would be generated by the machine were the conventional low carbon steel material used instead of the enhanced performance steel material for the magnetically active machine portion.

16. The combination of claim 15, wherein the comparatively lesser back EMF produced by the machine comprising the magnetically active portion using the enhanced performance steel material at the given torque level in the low torque region, relative to the back EMF that would be generated by the machine were the conventional low carbon steel material used instead of the enhanced performance steel material for the magnetically active machine portion, is manifested by a comparatively higher motor output speed.

17. The combination of claim 16, wherein the engine is capable of being cranked under warm start conditions at comparatively higher speed and/or higher torque by the machine including the magnetically active machine portion using the enhanced performance steel material, relative to the speed and/or torque at which the engine would be cranked by the machine were the conventional low carbon steel material used instead of the enhanced performance steel material for the magnetically active machine portion.

18. The combination of claim 16, wherein the motor comprises the magnetically active machine portion for which the enhanced performance steel material is used.

19. A rotary electric starter machine comprising an electric motor, a housing surrounding the motor, and a pinion connected to the motor, at least one of the motor and the housing comprising a magnetically active portion of the machine; and
   wherein the magnetically active motor portion is made of an enhanced performance steel material having a flux density at a given magnetizing force level that is at least about 20% less than the flux density at the given magnetic force level of a conventional low carbon steel material chosen from the group consisting of AISI 1008 and AISI 1010 steel.

20. The starter machine of claim 19, wherein the given magnetizing force level is less than approximately 100 ampere-turns/inch.

* * * * *